US011965363B2

(12) United States Patent
Odom

(10) Patent No.: US 11,965,363 B2
(45) Date of Patent: Apr. 23, 2024

(54) BARN DOOR HANDLE ASSEMBLY, STRIKE ASSEMBLY, AND LOCK SYSTEM

(71) Applicant: Triangle Brass Manufacturing Company, Inc., Los Angeles, CA (US)

(72) Inventor: Curtis Patrick Odom, Vista, CA (US)

(73) Assignee: Triangle Brass Manufacturing Co., INC., Oceanside, CA (US)

( * ) Notice: Subject to any disclaimer, the term of this patent is extended or adjusted under 35 U.S.C. 154(b) by 523 days.

(21) Appl. No.: 16/370,911

(22) Filed: Mar. 30, 2019

(65) Prior Publication Data

US 2019/0301204 A1 Oct. 3, 2019

Related U.S. Application Data

(60) Provisional application No. 62/651,081, filed on Mar. 31, 2018.

(51) Int. Cl.

*E05B 15/02* (2006.01)
*E05B 3/00* (2006.01)
*E05B 65/08* (2006.01)
*E05B 15/00* (2006.01)

(52) U.S. Cl.

CPC .......... *E05B 65/0811* (2013.01); *E05B 3/003* (2013.01); *E05B 15/0205* (2013.01); *E05B 15/022* (2013.01); *E05Y 2900/132* (2013.01); *Y10T 292/68* (2015.04); *Y10T 292/705* (2015.04); *Y10T 292/707* (2015.04)

(58) Field of Classification Search

CPC ............... Y10T 292/68; Y10T 292/705; Y10T 292/707; E05B 15/02; E05B 15/022; E05B 15/024; E05B 15/025; Y10S 292/46; Y10S 292/60

See application file for complete search history.

(56) References Cited

U.S. PATENT DOCUMENTS 114,841 A * 5/1871 Mitchell ............. E05B 15/0245 292/341.19
554,965 A * 2/1896 Squires ................... E05B 55/12 70/151 R
1,873,528 A * 8/1932 Anstine ............... E05B 15/0245 292/341.19
1,894,913 A * 1/1933 Sadler ....................... E05C 1/04 292/104
2,370,781 A * 3/1945 Cullum ............... E05B 17/2003 292/346

(Continued)

FOREIGN PATENT DOCUMENTS

CA 2301442 A1 * 9/2001 ........... E05B 15/024
FR 2749874 A1 * 12/1997 ........... E05B 15/022

*Primary Examiner* — Carlos Lugo

(74) *Attorney, Agent, or Firm* — The Iwashko Law Firm; Lev Ivan Gabriel Iwashko

(57) ABSTRACT

A barn door and wall strike assembly, including a barn door to slide laterally in a first direction and a second direction with respect to a door frame, a handle set assembly attached to the barn door, the handle set assembly including a handle to allow the barn door to open, and a lock having a bolt to lock the barn door when the bolt is extended, and a wall strike attached to the door frame, the strike including a plate to contact the door frame, and a bolt receiving member disposed on the plate, the bolt receiving member comprising an aperture to receive the bolt.

4 Claims, 12 Drawing Sheets

(56) References Cited

U.S. PATENT DOCUMENTS

| | | | | | |
|---|---|---|---|---|---|
| 2,401,854 | A * | 6/1946 | Berry, Jr. | E05B 15/0245 292/341.19 |
| 2,572,428 | A * | 10/1951 | Anstine | E05B 15/0245 292/341.18 |
| 2,676,480 | A * | 4/1954 | Check | E05B 17/2003 70/418 |
| 2,678,843 | A * | 5/1954 | Steffan | E05B 15/0245 292/341.18 |
| 2,683,054 | A * | 7/1954 | Earman | E05B 17/2003 292/340 |
| 2,731,822 | A * | 1/1956 | Bargman | E05B 85/28 70/135 |
| 3,039,807 | A * | 6/1962 | Agnese | E05B 17/2003 292/346 |
| 3,606,430 | A * | 9/1971 | Parmel | E05B 15/0245 292/341.18 |
| 4,076,294 | A * | 2/1978 | Holmberg | E05B 15/022 292/340 |
| 4,105,235 | A * | 8/1978 | Thiel | E05B 15/0245 292/341.18 |
| 4,312,527 | A * | 1/1982 | Tannery | E05B 17/2088 292/197 |
| 5,003,727 | A * | 4/1991 | Watten | E05B 15/0205 292/346 |
| 5,118,151 | A * | 6/1992 | Nicholas, Jr. | E05B 15/0245 29/437 |
| 5,171,050 | A * | 12/1992 | Mascotte | E05B 15/025 292/340 |
| 5,452,928 | A * | 9/1995 | Donald | E05B 15/102 292/169.13 |
| 6,814,401 | B2 * | 11/2004 | Takada | E05B 85/045 292/341.18 |
| 7,942,457 | B1 * | 5/2011 | Bell | E05B 15/102 292/6 |
| 8,469,413 | B2 * | 6/2013 | Novajovsky | E05B 15/0245 292/341.19 |
| 10,837,201 | B2 * | 11/2020 | Nicoara | E05B 47/004 |

* cited by examiner

BARN DOOR HANDLE ASSEMBLY, STRIKE ASSEMBLY, AND LOCK SYSTEM

CROSS-REFERENCE TO RELATED APPLICATIONS

This application claims priority under 35 USC § 120 from U.S. Provisional Application No. 62/651,081, filed on Mar. 31, 2018, in the United Stated Patent and Trademark Office, the disclosure of which is incorporated herein in its entirety.

BACKGROUND

1. Field

The present general inventive concept relates to a barn door handle assembly, a strike assembly, and a lock system.

2. Description of the Related Art

Conventional interior doors are usually connected to a wall using door hinges, which allow the conventional interior doors to swing open up to 180-degrees. Unfortunately, the motion of the conventional interior doors swinging open and closed results in an undesirable and uneconomical use of space. As such, there has been a trend to change from conventional swinging interior doors to sliding "barn doors," in order to conserve space and to add to a room's overall aestheticism. More specifically, a sliding barn door typically is attached to and suspended from a horizontal track located above the door, such that the door slides back and forth along the track until a stopper along the track is hit.

However, these new interior barn doors are limited in functionality, as there has been no easy and convenient way to lock these barn doors. Accordingly, sliding barn doors have typically been utilized to separate rooms that do not require locking, such as living rooms and dining rooms.

Also, there has been no mechanism to prevent the barn door from sliding off the track in an event of a stopper failure.

Therefore, there is a need for an easy and convenient mechanism to stop and lock an interior sliding barn door, so that barn doors may be utilized for rooms that require locking doors, such as bedrooms and bathrooms.

Furthermore, since a sliding barn door is relatively independent with respect to a separate locking mechanism, there is a need for a guide to help direct the barn door to a proper position with respect to the locking mechanism.

A barn door strike has recently been introduced as a solution to the problem of stopping and locking sliding barn door that slides back and forth along a horizontal track.

However, strike installation problems may arise if the horizontal track was not installed properly, if the door is slightly warped, if the building "settles" after time and causes slight wall deformation, or if an installation of the door was slightly tilted or offset from the wall at an undesirable distance. More specifically, if a user notices that the barn door strike has been improperly screwed into a wall and/or does not coincide properly with the barn door, then the user must unscrew the entire strike, drill new holes into the wall, and re-screw the strike into the wall. Alternatively, the user must uninstall the entire door and horizontal track, and then reinstall the horizontal track in a new position so that the door properly coincides with the strike.

Therefore, there is a need for a mechanism that allows for easy adjustment of a barn door strike without uninstalling the strike, barn door, or horizontal track.

Also, if the wall upon which the strike is installed is not reinforced from within (i.e., there is no wooden stud inside the wall), then the strike may become loose over time. As such, the strike may eventually break off the wall due to that of reinforcement.

Therefore, there is a need for a barn door strike that is strong and reinforced to prevent the strike from breaking off a wall due to normal wear and tear.

SUMMARY

The present general inventive concept provides a barn door handle assembly, a strike assembly, and a lock system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a barn door and wall strike assembly, including a barn door to slide laterally in a first direction and a second direction with respect to a door frame, a handle set assembly attached to the barn door, the handle set assembly including a handle to allow the barn door to open, and a lock having a bolt to lock the barn door when the bolt is extended, and a wall strike attached to the door frame, the strike including a plate to contact the door frame, and a bolt receiving member disposed on the plate, the bolt receiving member comprising an aperture to receive the bolt.

The bolt may include at least one protrusion disposed on side portions of the bolt to extend into the bolt receiving member when the bolt is extended.

The bolt receiving member may protrude from the door frame in a direction perpendicular to the barn door sliding direction.

The foregoing and/or other features and utilities of the present general inventive concept may also be achieved by providing a barn door strike assembly to receive a barn door lock bolt, the strike assembly including a main body, including a bolt receiving aperture to receive the barn door lock bolt therein, and a strike base connected to the main body to attach the main body to a wall.

BRIEF DESCRIPTION OF DRAWINGS

These and/or other features and utilities of the present general inventive concept will become apparent and more readily appreciated from the following description of the embodiments, taken in conjunction with the accompanying drawings of which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
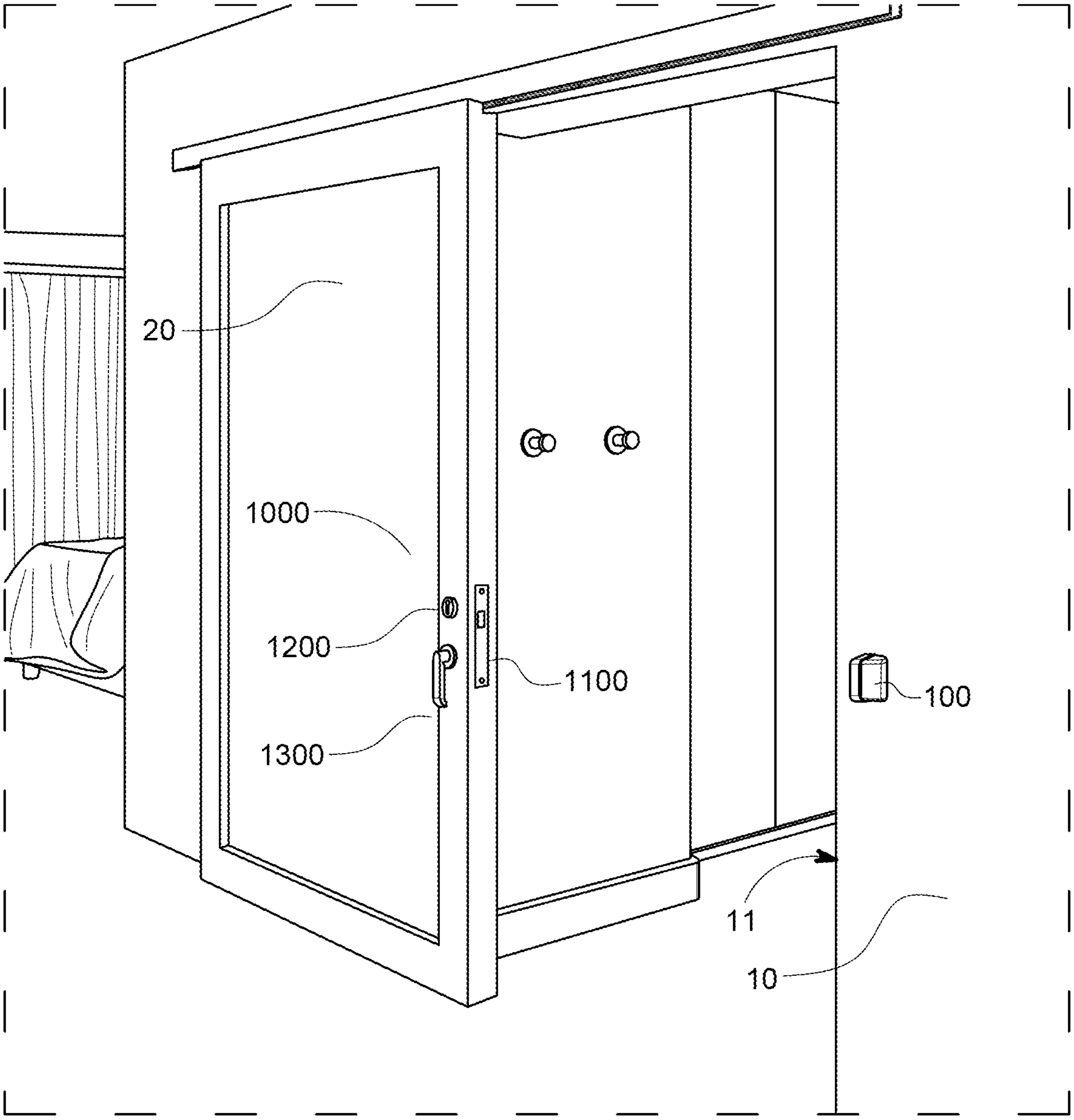
FIG. 1 illustrates a barn door lock and handle set installed on a barn door and a barn door strike installed on a wall, according to an exemplary embodiment of the present general inventive concept.

FIG. 1 illustrates a barn door lock and handle set 1000 installed on a barn door 20 and a barn door strike 100 installed on a wall 10, according to an exemplary embodiment of the present general inventive concept.

As illustrated in FIG. 1, the barn door strike 100 (a.k.a., a wall strike 100) may be installed on the wall 10, and may be installed on the barn door 20, which may slide laterally back and forth parallel to the wall 10. Specifically, the barn door strike 100 may be installed at a door frame 11 of the wall 10.

Figure 2A:
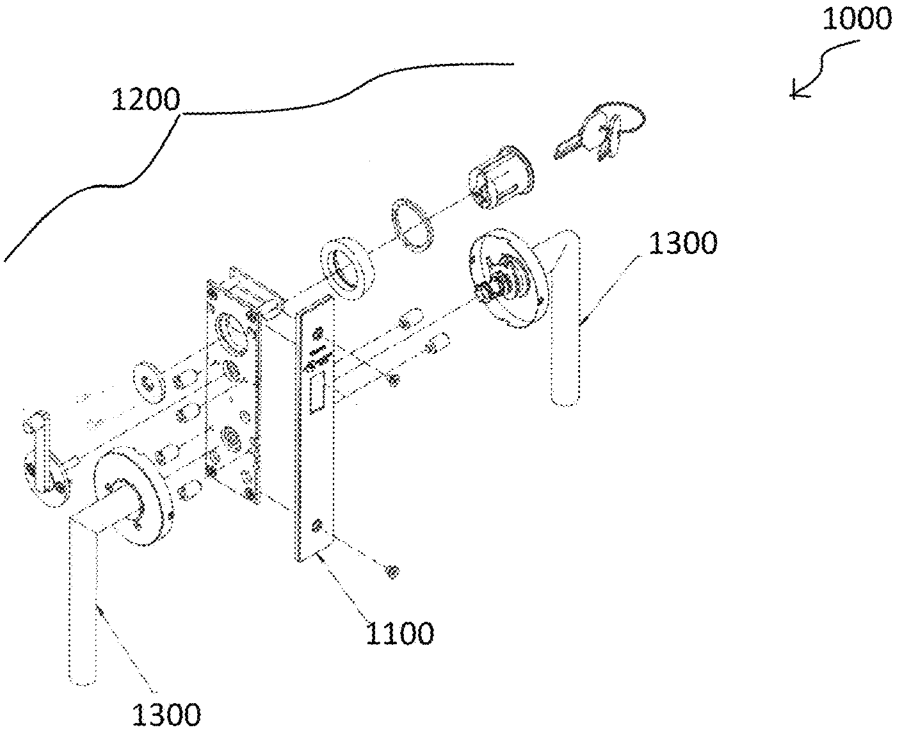
FIG. 2A illustrates an exploded view of the barn door lock and handle set, according to an exemplary embodiment of the present general inventive concept.

FIG. 2A illustrates an exploded view of the barn door lock and handle set 1000, according to an exemplary embodiment of the present general inventive concept.

Figure 2B:
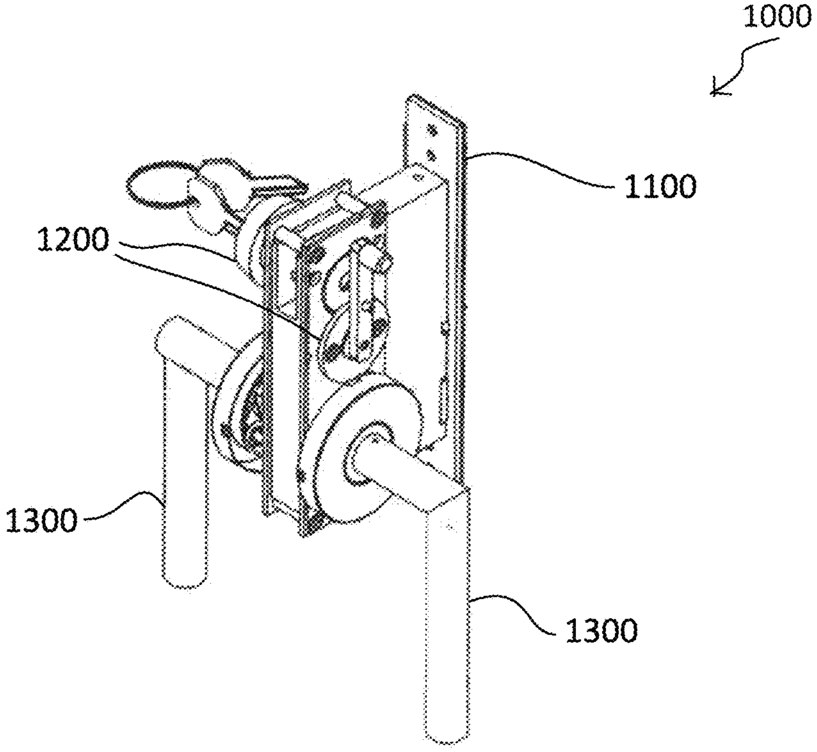
FIG. 2B illustrates an isometric view of the barn door lock and handle set, according to an exemplary embodiment of the present general inventive concept.

FIG. 2B illustrates an isometric view of the barn door lock and handle set 1000, according to an exemplary embodiment of the present general inventive concept.

Referring to FIGS. 1 through 2B, the barn door lock and handle set 1000 may include a faceplate 1100, a lock assembly 1200, and a handle assembly 1300.

When the barn door 20 slides toward the barn door strike 100, the faceplate 1100 of the barn door lock and handle set 1000 may come into contact with the barn door strike 100, and the lock assembly 1200 may engage with the barn door strike 100 such that the barn door 20 is effectively in a locked state and cannot move away from the barn door strike 100. As such, the barn door 20 may be locked.

Figure 3A:
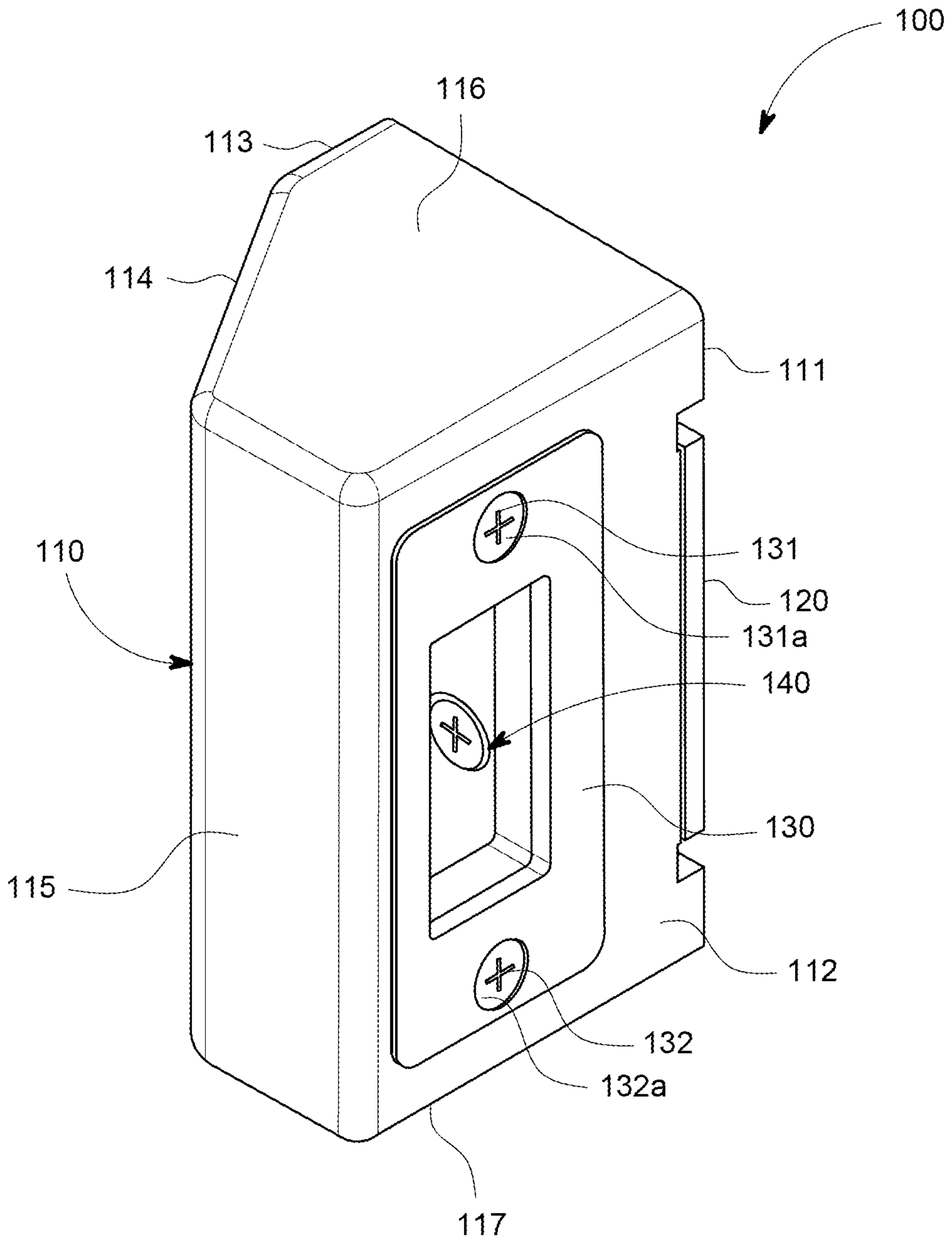
FIG. 3A illustrates an isometric view of the barn door strike, according to an exemplary embodiment of the present general inventive concept.

FIG. 3A illustrates an isometric view of the barn door strike 100, according to an exemplary embodiment of the present general inventive concept.

Figure 3B:
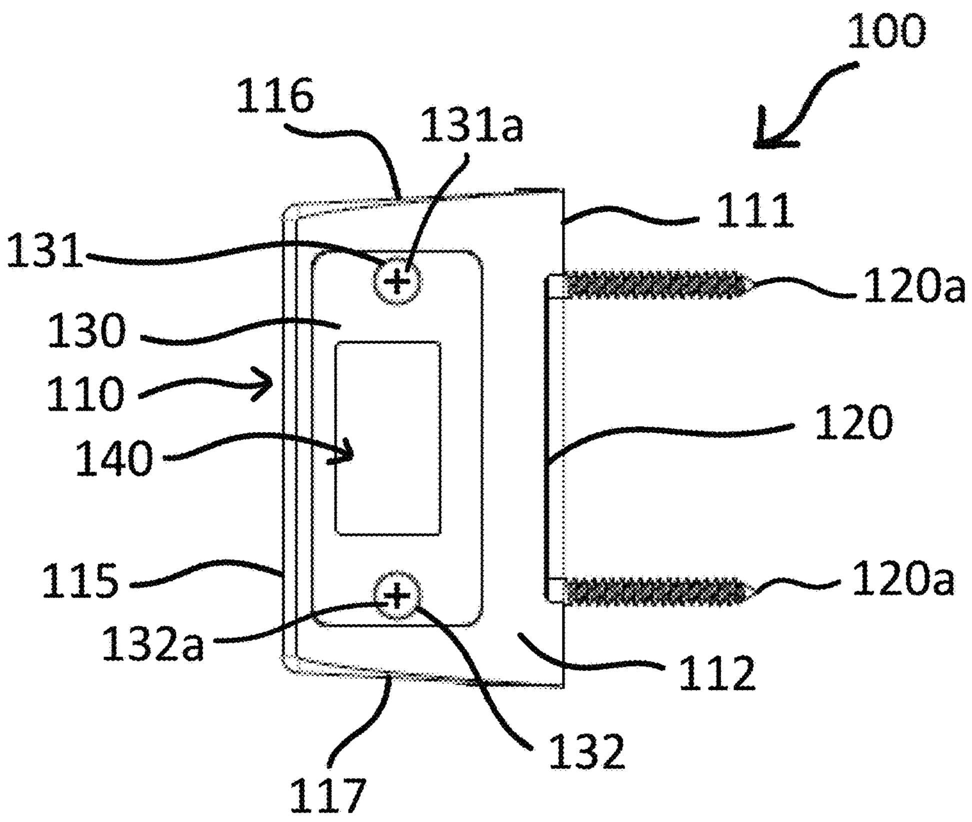
FIG. 3B illustrates a side view of the barn door strike, according to an exemplary embodiment of the present general inventive concept.

FIG. 3B illustrates a side view of the barn door strike 100, according to an exemplary embodiment of the present general inventive concept.

Figure 3C:
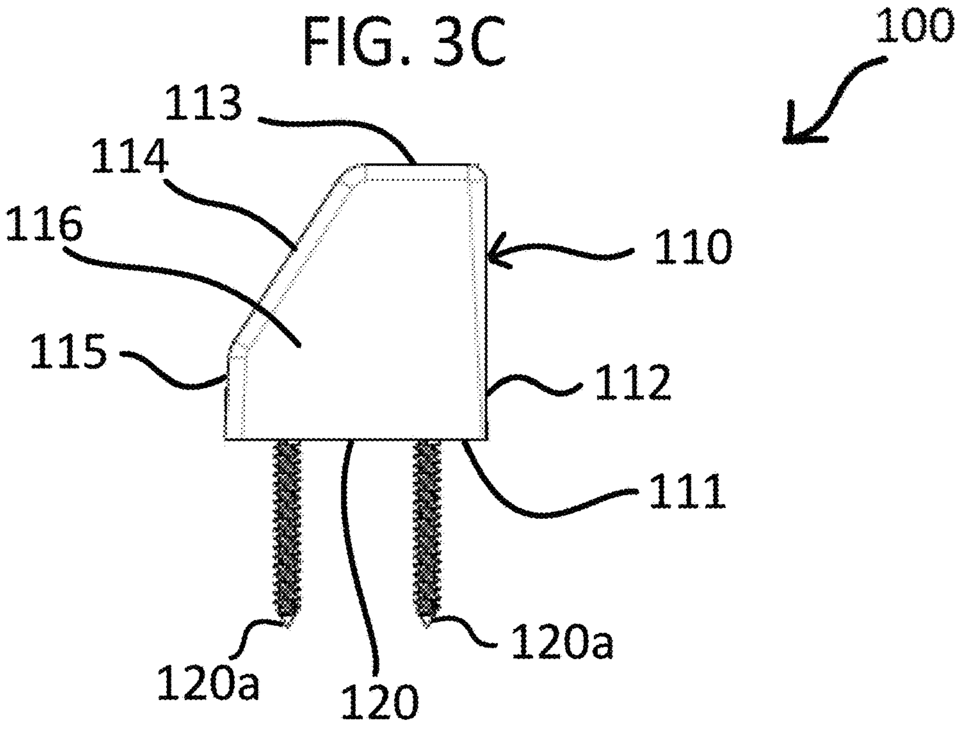
FIG. 3C illustrates a top view of the barn door strike, according to an exemplary embodiment of the present general inventive concept.

FIG. 3C illustrates a top view of the barn door strike 100, according to an exemplary embodiment of the present general inventive concept.

Referring to FIGS. 3A through 3C, the barn door strike 100 may include a main body 110, a strike base 120, a plate 130, and a bolt receiving aperture 140, but is not limited thereto.

The main body 110 may include a wall contacting side 111, a faceplate receiving side 112, a rear side 113, an angled side 114, an outer side 115, an upper side 116, and a bottom side 117, but is not limited thereto.

The wall contacting side 111 may contact the wall 10, and the strike base 120 may be connected to the wall contacting side 111 to also contact the wall 10 in order to provide a reinforcement function for the main body 110. As such, when the faceplate 1100 contacts the faceplate receiving side 112, the strike base 120 may provide support for the main body 110 to keep the main body 110 disposed on and connected to the wall 10.

The plate 130 may be attached to the faceplate receiving side 112 via a plurality of connecting members 131*a* and 132*a* (e.g., screws, bolts, nails, etc.) disposed through connecting member receiving apertures 131 and 132 disposed through the plate 130. Also, the strike base 120 may be attached to the wall 10 via connecting members 120*a* (e.g., screws, bolts, nails, etc.).

The bolt receiving aperture 140 may receive therein a bolt (or latch) of the lock assembly 1200 of the barn door lock and handle set 1000, such that the barn door 20 may be locked with respect to the barn door strike 100.

As can be seen in FIGS. 1 and 3A through 3C, the barn door strike 100 is designed to protrude perpendicularly away from the wall 10, in order to allow for accurate contact with the barn door lock and handle set 1000.

Figure 4A:
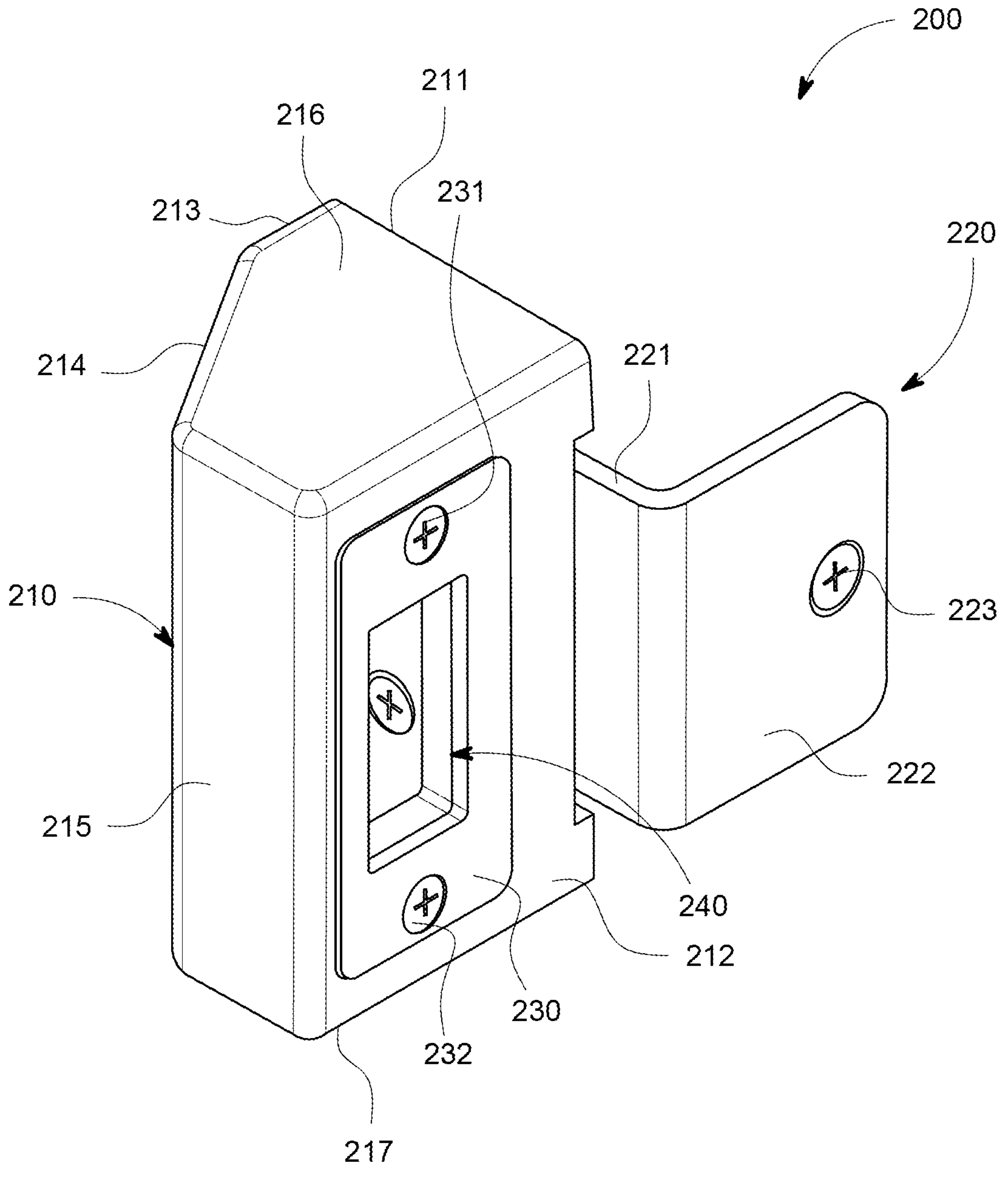
FIG. 4A illustrates an isometric view of a barn door strike, according to another exemplary embodiment of the present general inventive concept.

FIG. 4A illustrates an isometric view of a barn door strike 200, according to another exemplary embodiment of the present general inventive concept.

Figure 4B:
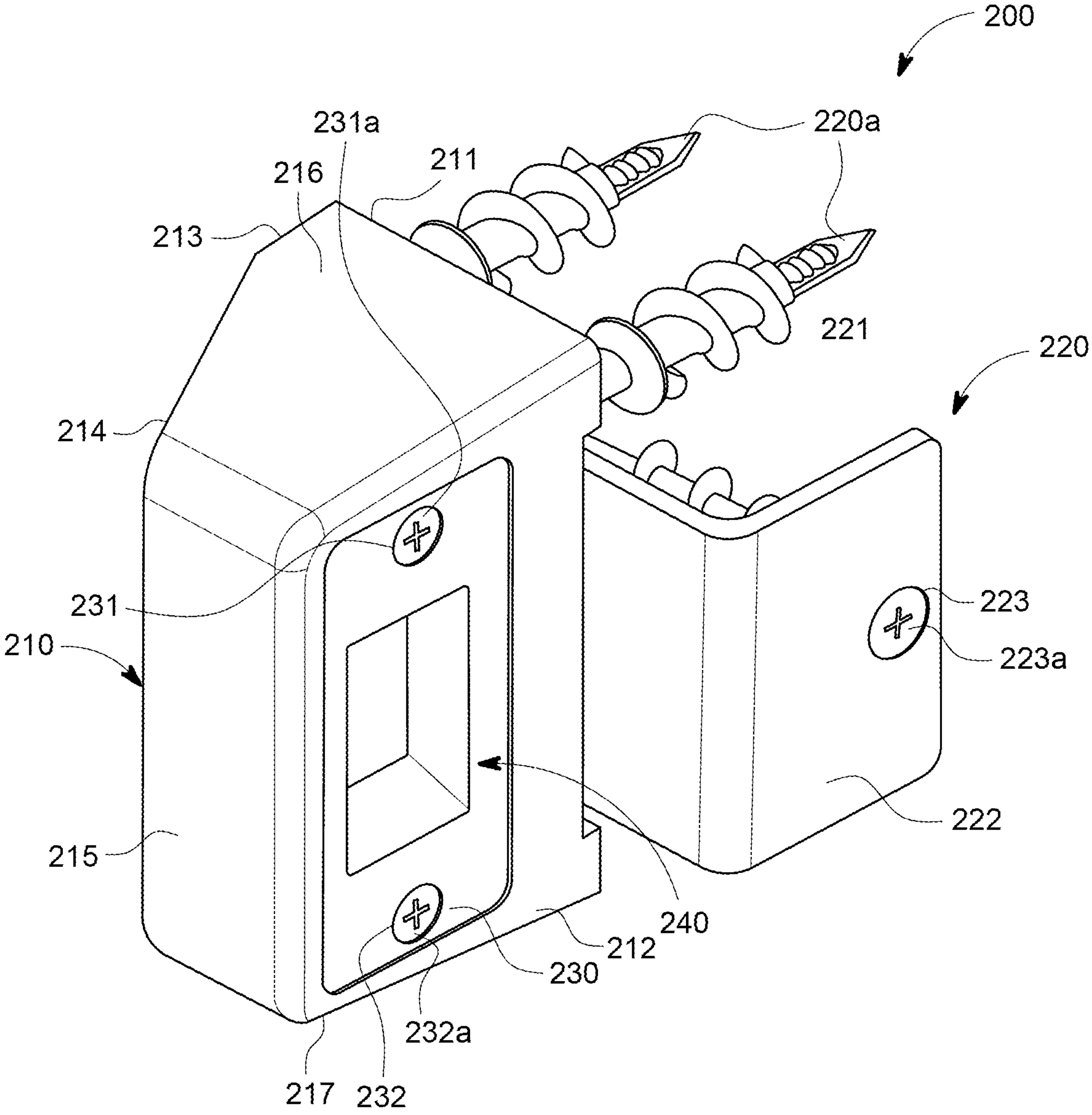
FIG. 4B illustrates another isometric view of a barn door strike, according to another exemplary embodiment of the present general inventive concept.

FIG. 4B illustrates another isometric view of a barn door strike 200, according to another exemplary embodiment of the present general inventive concept.

Figure 4C:
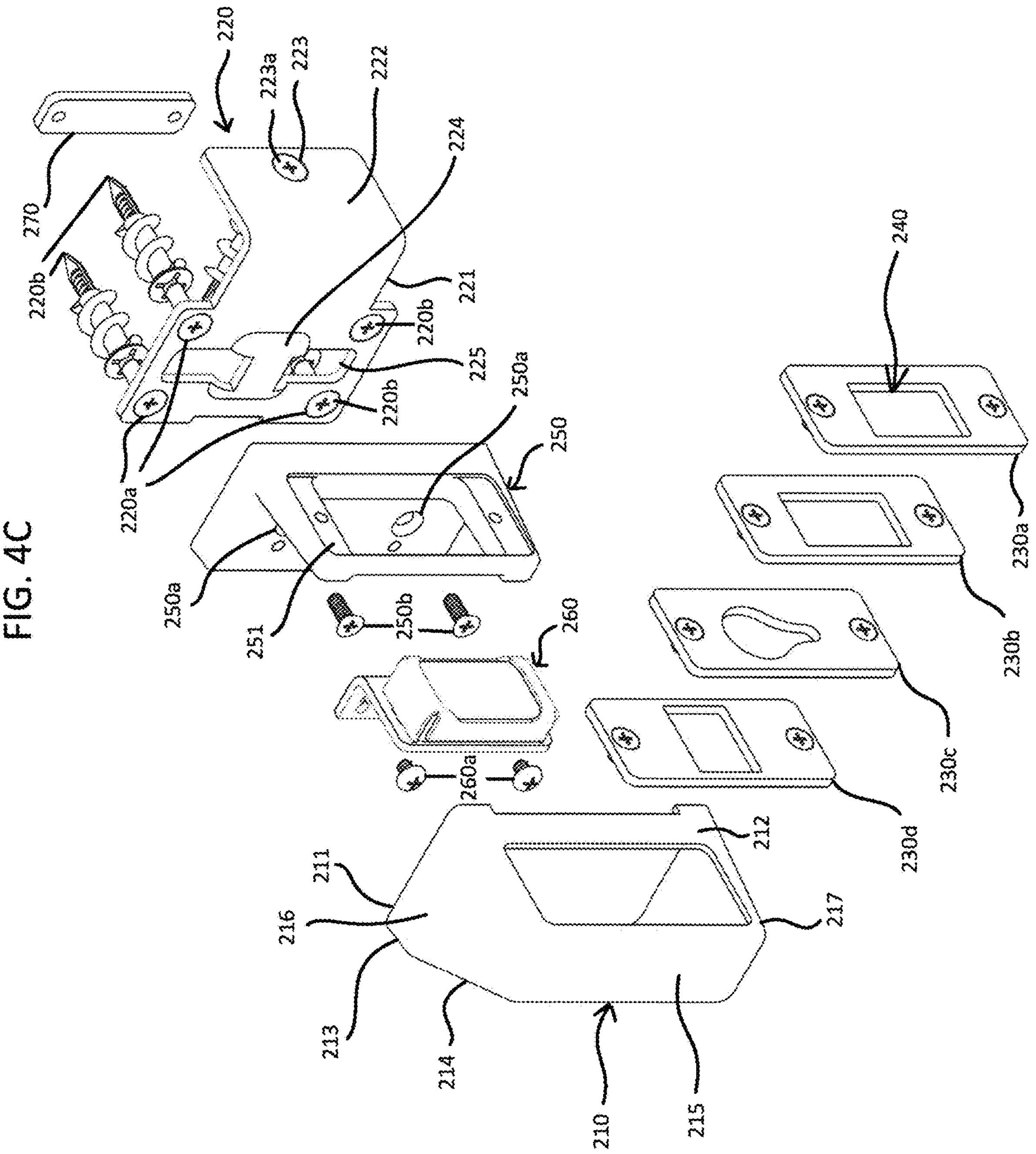
FIG. 4C illustrates an exploded view of the barn door strike of FIG. 4A, according to another exemplary embodiment of the present general inventive concept.

FIG. 4C illustrates an exploded view of the barn door strike 200 of FIG. 4A, according to another exemplary embodiment of the present general inventive concept.

Figure 4D:
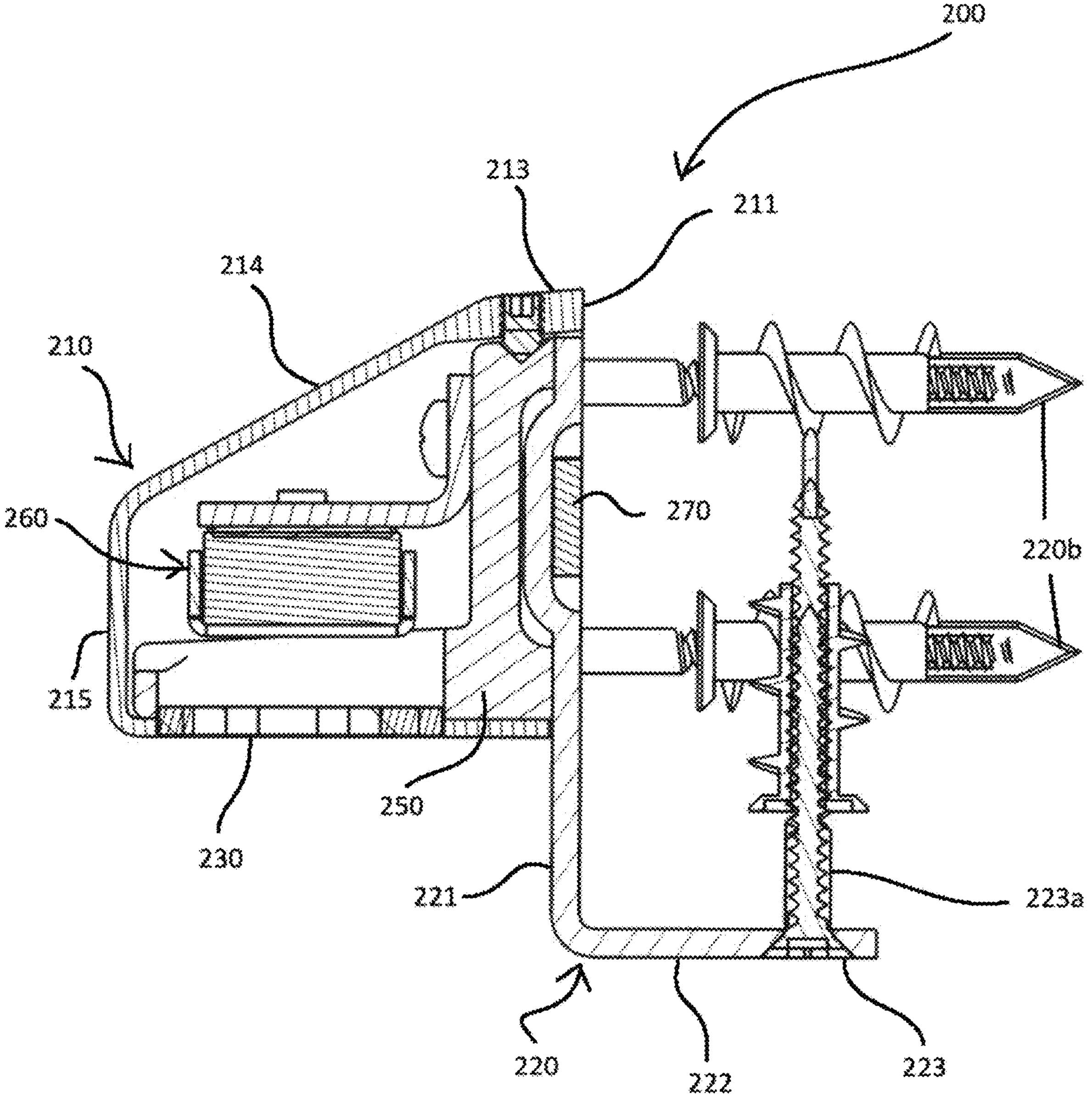
FIG. 4D illustrates a top cross-sectional view of the barn door strike of FIG. 4A, according to another exemplary embodiment of the present general inventive concept.

FIG. 4D illustrates a top cross-sectional view of the barn door strike 200 of FIG. 4A, according to another exemplary embodiment of the present general inventive concept.

Referring to FIGS. 4A through 4D, the barn door strike 200 may include a main body 210, a strike base 220, a plate 230, a bolt receiving aperture 240, a plate receiving member 250, a bolt securing member 260, and a wall connecting member 270, but is not limited thereto.

The main body 210 may include a wall contacting side 211, a faceplate receiving side 212, a rear side 213, an angled side 214, an outer side 215, an upper side 216, and a bottom side 217, but is not limited thereto.

The wall contacting side 211 may contact the wall 10, and the strike base 220 may be connected to the wall contacting side 211 to also contact the wall 10 in order to provide a reinforcement function for the main body 210. As such, when the faceplate 1100 contacts the faceplate receiving side 212, the strike base 220 may provide support for the main body 210 to keep the main body 210 disposed on and connected to the wall 10.

The strike base 220 illustrated in FIGS. 4A through 4D may be different from the strike base 120 illustrated in FIGS. 3A through 3D, for at least the reason that the strike base 220 is L-shaped to provide extra reinforcement functionality.

Specifically, the strike base 220 may include a plurality of connecting member receiving apertures 220*a*, a main body contacting portion 221, a door frame contacting portion 222, and a door frame connecting aperture 223.

The main body contacting portion 221 may be connected both to the main body 210 and the wall 10. The door frame contacting portion 222 may be substantially perpendicular with respect to the main body contacting portion 221, such that the door frame connecting aperture 223 may allow a connecting member 223*a* (e.g., a screw, bolt, nail, etc.) to be inserted therethrough to connect the door frame contacting portion 222 to the door frame 11.

The plate 230 may be attached to the faceplate receiving side 212 via a plurality of connecting members 231*a* and 232*a* (e.g., screws, bolts, nails, etc.) disposed through connecting member receiving apertures 231 and 232 disposed through the plate 230. Also, the strike base 220 may be attached to the wall 10 via connecting members 220*b* (e.g., screws, bolts, nails, etc.) disposed through the plurality of connecting member receiving apertures 220*a* disposed through the strike base 220.

The bolt receiving aperture 240 may receive therein a bolt (or latch) of the lock assembly 1200 of the barn door lock and handle set 1000, such that the barn door 20 may be locked with respect to the barn door strike 200.

As can be seen in FIGS. 1 and 4A through 4D, the barn door strike 200 is designed to protrude perpendicularly away from the wall 10, in order to allow for accurate contact with the barn door lock and handle set 1000.

Referring to FIG. 4C, the plate receiving member 250 may include a plurality of connecting member receiving apertures 250*a* and a plate receiving groove 251, but is not limited thereto.

Referring to FIG. 4C, it is clear that various different type of plates 230*a*, 230*b*, 230*c*, and 230*d* may be installed on the main body 210, in order to allow different shaped bolts/latches to be inserted into the bolt receiving aperture 240. Furthermore, the plate receiving groove 251 may be a recessed surface to which the plate 230 may be connected. The bolt securing member 260 may provide reinforcement within the main body 210 to resist movement of the bolt of the lock assembly 1200 while the bolt is within at least a portion of the bolt securing member 260.

Referring again to FIG. 4C, the strike base 220 may include an I-slide adjustment member 224 and an I-slide aperture 225. The I-slide adjustment member 224 may slide vertically (i.e., up and down) along the I-slide aperture 225, in order to allow the main body 210 to be easily adjusted if the barn door strike 200 is misaligned with respect to the barn door lock and handle set 1000. Moreover, the main body 210 may be connected to the wall 10 via a connection to a combination of the bolt securing member 260 and the plate receiving member 250 being connected to the wall connecting member 270 as disposed on the wall 10 and in alignment with the I-slide aperture 225. As such, a plurality of connecting members 250*b* (e.g., screws, bolts, nails, etc.) may be disposed through the connecting member receiving apertures 250*a* disposed through the plate receiving member 250. Similarly, a plurality of connecting members 250*b* (e.g., screws, bolts, nails, etc.) may be disposed through the bolt securing member 260.

Figure 5A:
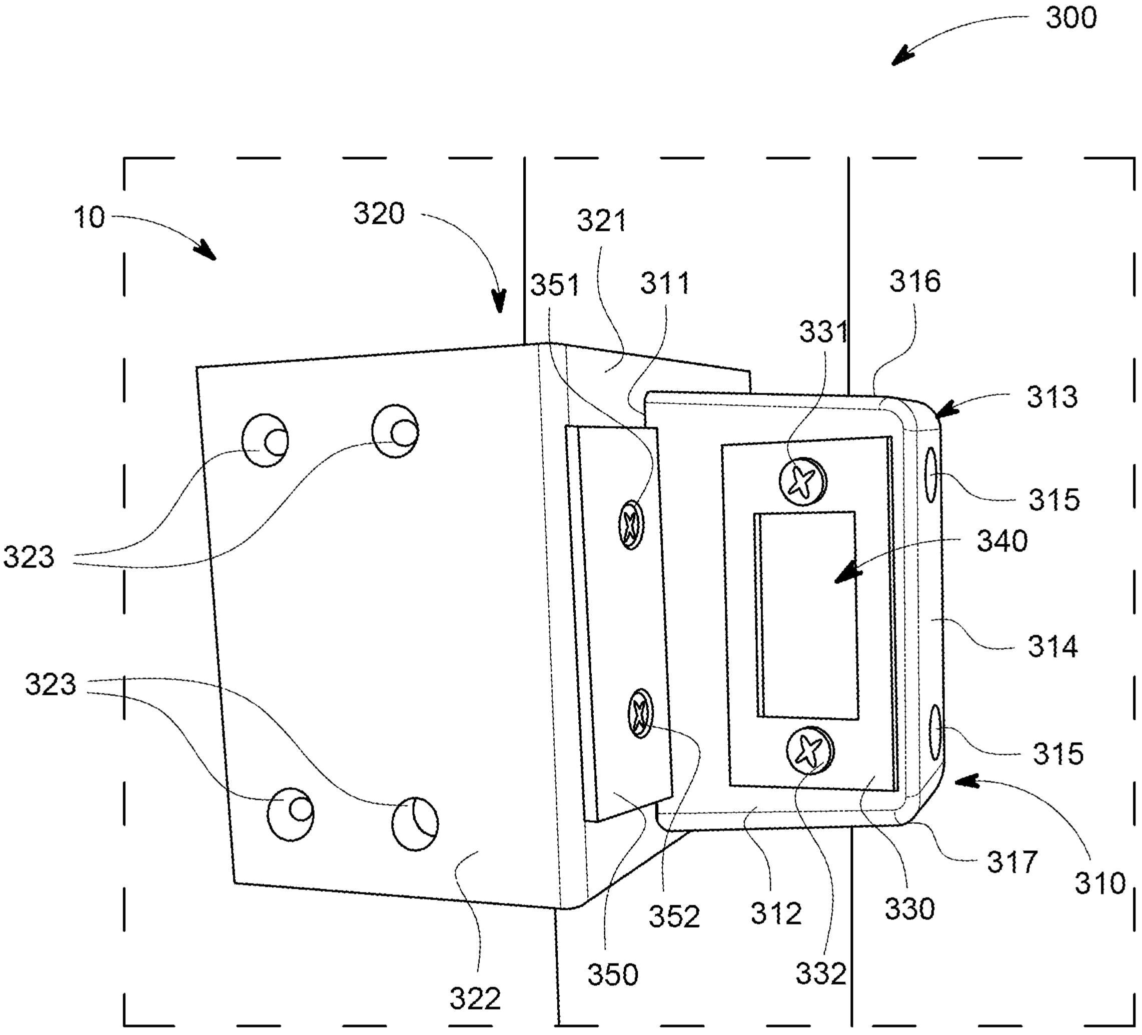
FIG. 5A illustrates a side view of a barn door strike being installed on a wall, according to another exemplary embodiment of the present general inventive concept.

FIG. 5A illustrates a side view of a barn door strike 300 being installed on a wall 10, according to another exemplary embodiment of the present general inventive concept.

Figure 5B:
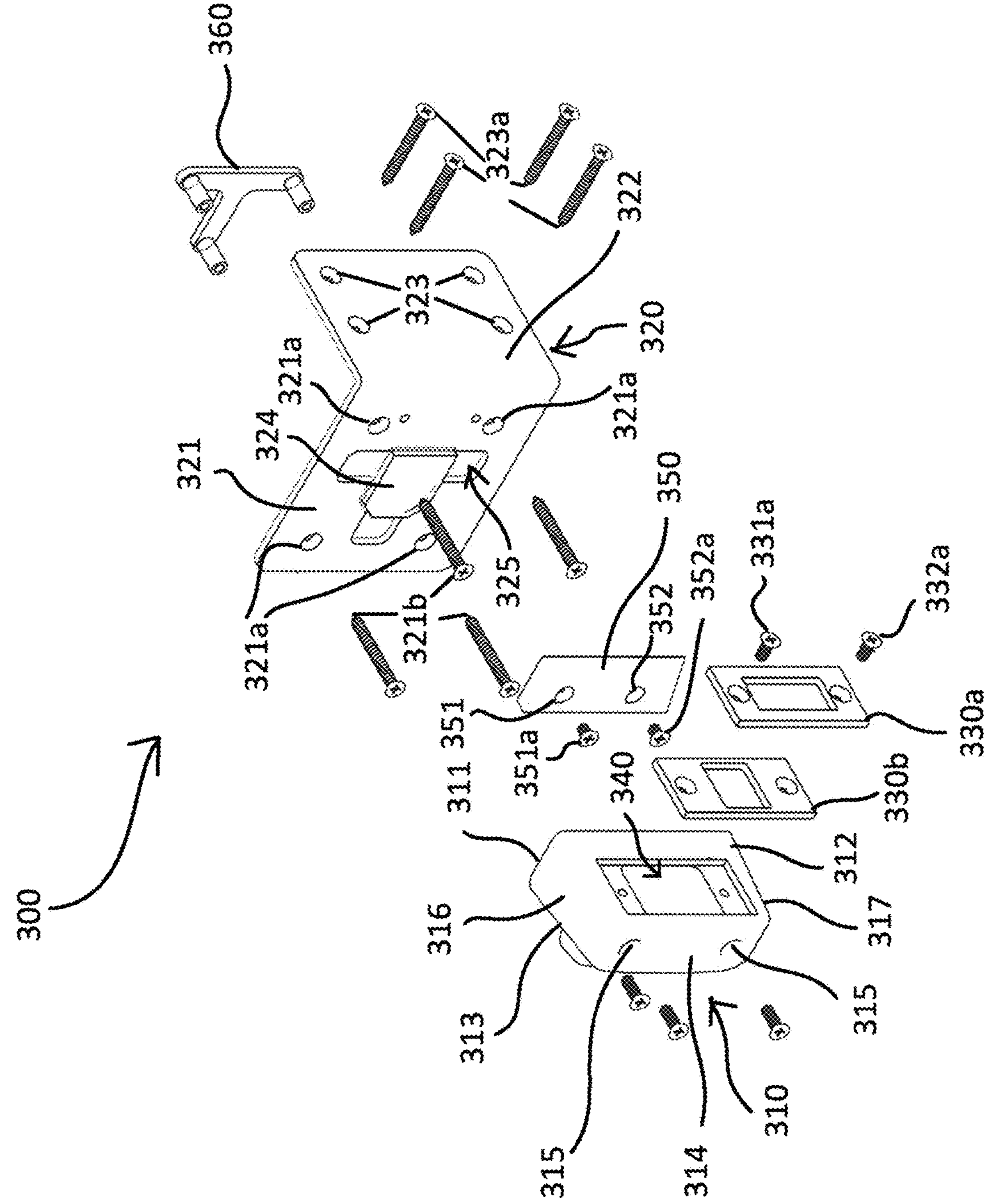
FIG. 5B illustrates an exploded view of the barn door strike of FIG. 5A, according to another exemplary embodiment of the present general inventive concept.

FIG. 5B illustrates an exploded view of the barn door strike 300 of FIG. 5A, according to another exemplary embodiment of the present general inventive concept.

Referring to FIGS. 5A through 5B, the barn door strike 300 may include a main body 310, a strike base 320, a plate 330, a bolt receiving aperture 340, a guide ramp 350, and a wall connecting member 360, but is not limited thereto.

The main body 310 may include a wall contacting side 311, a faceplate receiving side 312, a rear side 313, and outer side 314, a plurality of adjustment apertures 315, an upper side 316, and a bottom side 317, but is not limited thereto.

The wall contacting side 311 may contact the wall 10, and the strike base 320 may be connected to the wall contacting side 311 to also contact the wall 10 in order to provide a reinforcement function for the main body 310. As such, when the faceplate 1100 contacts the faceplate receiving side 312, the strike base 320 may provide support for the main body 310 to keep the main body 310 disposed on and connected to the wall 10.

The strike base 320 illustrated in FIGS. 5A through 5D may be different from the strike base 120 illustrated in FIGS.

3A through 3D, for at least the reason that the strike base 320 is L-shaped to provide extra reinforcement functionality.

Specifically, the strike base 320 may include a main body contacting portion 321, a door frame contacting portion 322, and a plurality of door frame connecting apertures 323.

The main body contacting portion 321 may including a plurality of contacting portion apertures 321*a*, but is not limited thereto.

The main body contacting portion 321 may be connected both to the main body 310 and the wall 10, such that the plurality of contacting portion apertures 321*a* may allow a plurality of connecting members 321*b* (e.g., a screw, bolt, nail, etc.) to be inserted therethrough. The door frame contacting portion 322 may be substantially perpendicular with respect to the main body contacting portion 321, such that the door frame connecting aperture 323 may allow a plurality of connecting members 323*a* (e.g., a screw, bolt, nail, etc.) to be inserted therethrough to connect the door frame contacting portion 322 to the door frame 11.

The plate 330 may be attached to the faceplate receiving side 312 via a plurality of connecting members 331*a* and 332*a* (e.g., screws, bolts, nails, etc.) disposed through connecting member receiving apertures 331 and 332 disposed through the plate 330.

The bolt receiving aperture 340 may receive therein a bolt (or latch) of the lock assembly 1200 of the barn door lock and handle set 1000, such that the barn door 20 may be locked with respect to the barn door strike 300.

As can be seen in FIGS. 1 and 5A through 5B, the barn door strike 300 is designed to protrude perpendicularly away from the wall 10, in order to allow for accurate contact with the barn door lock and handle set 1000.

Referring to FIG. 5B, it is clear that various different type of plates 330*a* and 330*b* may be installed on the main body 310, in order to allow different shaped bolts/latches to be inserted into the bolt receiving aperture 340.

Referring again to FIG. 5B, the strike base 320 may include a T-slide adjustment member 324 and a T-slide aperture 325. The T-slide adjustment member 324 may slide vertically (i.e., up and down) and horizontally (i.e., left and right) along the T-slide aperture 325, in order to allow the main body 310 to be easily adjusted if the barn door strike 300 is misaligned with respect to the barn door lock and handle set 1000. Moreover, the main body 310 may be connected to the door frame 11 via a connection to the strike base 320 being connected to the wall connecting member 360 as disposed on the door frame 11 and in alignment with the T-slide aperture 325

The ramp 350 may be attached to the main body contacting portion 321 via connecting members 351*a* and 352*a* (e.g., screws, bolts, nails, etc.) being inserted into ramp connecting apertures 351 and 352, respectively. The ramp 350 may allow the faceplate 1100 of the barn door lock and handle set 1000 to be guided smoothly onto the barn door strike 300. The ramp 350, therefore, may have a right-triangle shape, but is not limited thereto.

Figure 6:
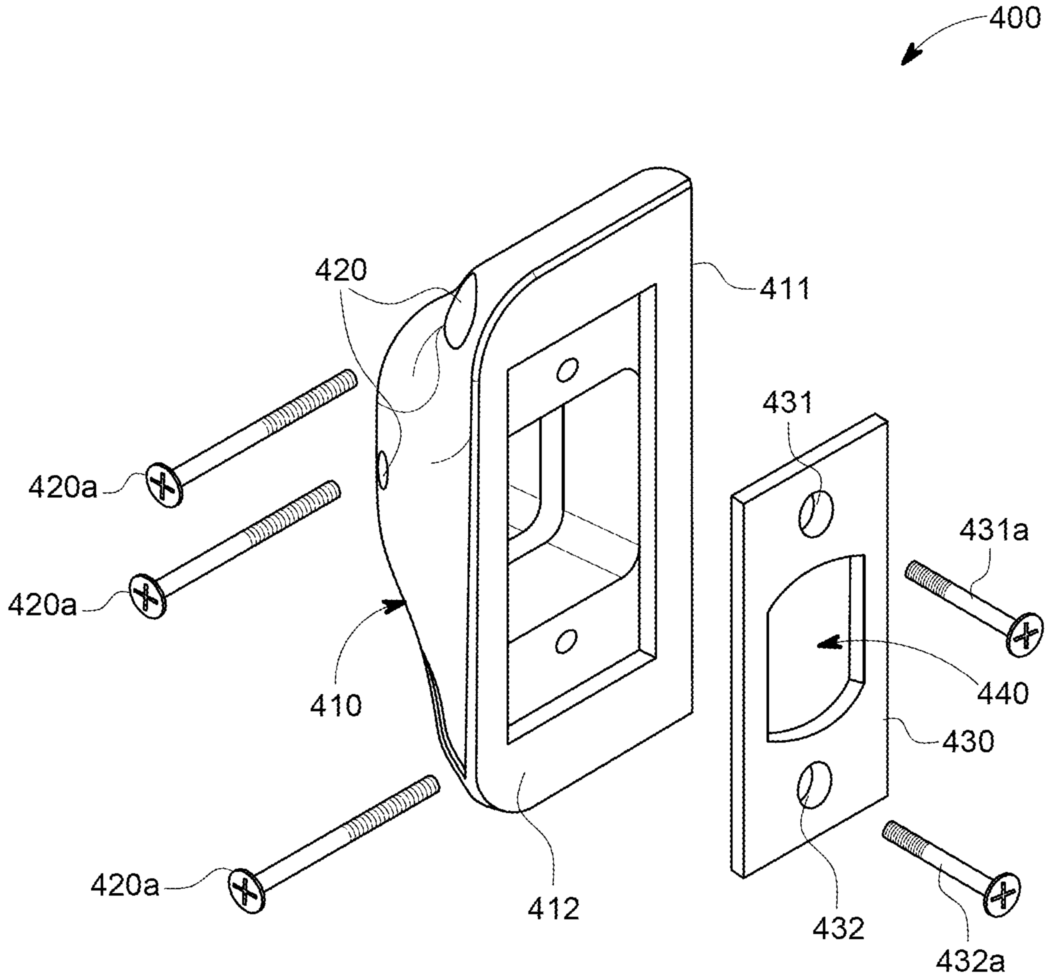
FIG. 6 illustrates an isometric view of a barn door strike, according to another exemplary embodiment of the present general inventive concept.

FIG. 6 illustrates an isometric view of a barn door strike 400, according to another exemplary embodiment of the present general inventive concept.

Referring to FIG. 6, the barn door strike 400 may include a main body 410, a plurality of strike attaching apertures 420, a plate 430, and a bolt receiving aperture 440, but is not limited thereto.

The main body 410 may include a wall contacting side 411 and a faceplate receiving side 412, but is not limited thereto.

The wall contacting side 411 may contact the wall 10, and the plurality of strike attaching apertures 420 may allow connecting members 420*a* (e.g., screws, bolts, nails, etc.) to be inserted therein to allow the main body 410 to remain disposed on and connected to the wall 10.

The plate 430 may be attached to the faceplate receiving side 412 via a plurality of connecting members 431*a* and 432*a* (e.g., screws, bolts, nails, etc.) disposed through connecting member receiving apertures 431 and 132, respectively, as disposed through the plate 430.

The bolt receiving aperture 440 may receive therein a bolt (or latch) of the lock assembly 1200 of the barn door lock and handle set 1000, such that the barn door 20 may be locked with respect to the barn door strike 400.

As can be seen in FIGS. 1 and 6, the barn door strike 400 is designed to protrude perpendicularly away from the wall 10, in order to allow for accurate contact with the barn door lock and handle set 1000.

Figure 7:
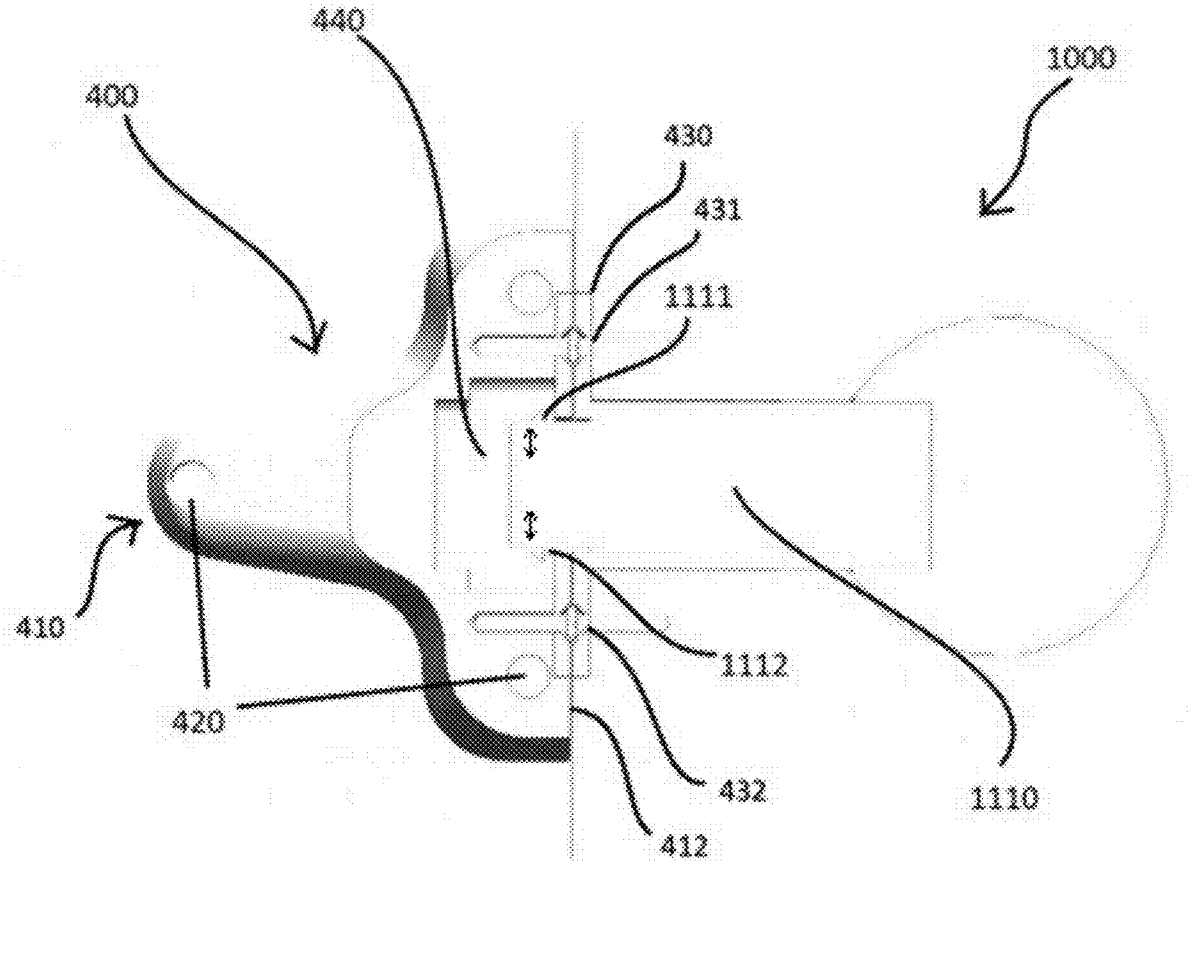
FIG. 7 illustrates a side cross-section view of a barn door lock interacting with a barn door strike, according to another exemplary embodiment of the present general inventive concept.

FIG. 7 illustrates a side cross-section view of a barn door lock bolt 1110 interacting with a barn door strike 400, according to another exemplary embodiment of the present general inventive concept.

Although FIG. 7 depicts the barn door strike 400 interacting with the barn door lock bolt 1110 of the barn door lock and handle set 1000, any one of the barn door strikes 100, 200, and/or 300 can be substituted for the barn door strike 400 to interact with the barn door lock bolt 1110 of the barn door lock and handle set 1000 in the same manner as described above.

Specifically, when inserted into the bolt receiving aperture 440 of the barn door strike 400, a plurality of locking protrusions 1111 and 1112 may extend outwardly to prevent the barn door lock bolt 1110 from being extracted from the bolt receiving aperture 440, thereby effectively locking the barn door 20 against the barn door strike 400.

The barn door lock and handle set 1000 may be attached to the barn door 20 at a side portion thereof. The barn door lock bolt 1110 may include a cylinder, a latch, a bolt, handles, a lock (openable with a key), a cam, a thumb turn assembly, a faceplate, screws, etc., but is not limited thereto. The latch may be a mortise-style latch, but is not limited thereto.

The barn door strike 200 may include the plate 230 to contact the door frame 11 and/or the wall 10, and the bolt receiving aperture 240 disposed on the plate 230, the bolt receiving aperture 240 to receive the latch therein. The strike base 220 may be shaped like an "L"-bracket, and may contact at least a portion of the wall 10 and/or the door frame 11, and the plate 230 may be disposed on at least a portion of the main body 210. The plate 230 may have a rectangular prism type shape, but may have a curved and/or a plurality of rounded edges for aesthetic purposes.

When the barn door lock bolt 1110 is opened, the latch (or bolt) may protrude out from an aperture and out from the faceplate 1100. The barn door lock bolt 1110 may also include a plurality of locking protrusions 1111 and 1112 (e.g., pegs) to protrude out of side portions of the barn door lock bolt 1110, such that the plurality of locking protrusions 1111 and 1112 may be inserted within the bolt receiving aperture 240 of the barn door strike 200.

When the plurality of locking protrusions 1111 and 1112 are inserted within the bolt receiving aperture 240 of the barn door strike 200, the plurality of locking protrusions 1111 and 1112 may prevent the barn door 20 from being opened, as the plurality of locking protrusions 1111 and 1112 contact at least a portion of at least one inner surface of the barn door strike 200 and may cause the barn door lock bolt 1110 to remain within the barn door strike 200, thereby effectively locking the barn door 20. The plurality of locking protrusions 1111 and 1112 may retract in response to the barn door lock bolt 1110 being retracted (i.e., the lock is unlocked). Additionally, the plurality of locking protrusions 1111 and 1112 may automatically lock the barn door 20 in response to the barn door lock bolt 1110 being fully extracted.

The barn door strike 300 may include a main body 310, a strike base 320, a plate 330, a bolt receiving aperture 340, a guide ramp 350, and a wall connecting member 360, but is not limited thereto.

The strike base 320 may be adjustable, even when attached to the door frame 11, and may move in various directions within various degrees in order to compensate for any structural defects in the wall 10, the barn door 20, and/or the ceiling. As such, the strike base 320 may be adjustable along the x, y, and/or z axis, using a T-slide adjustment member 324.

The guide ramp 350 may be disposed next to the bolt receiving aperture 340 on a same surface where the bolt receiving aperture 340 is disposed, such that the barn door 20 and the barn door lock bolt 1110 may be guided toward the bolt receiving aperture 340, such that a side of the barn door 20 may contact the bolt receiving aperture 340 properly and “flush.” As such, the barn door lock bolt 1110 may properly enter the bolt receiving aperture 340.

A shim may be installed between the wall 10 and the strike base 320, such that the strike base 320 may be disposed further from the wall 10 to compensate for irregularities of a shape of the barn door 20, the wall 10, and/or the ceiling.

The plate 330 may be include a 90-degree bracket, but is not limited thereto. The connecting members 351*a* and 352*a* may be installed in various locations to promote stability of the plate 330. The barn door 20 may be prevented from slamming into the strike base 320 (i.e., the barn door 20 stops on the track). However, the connecting members 351*a* and 352 may provide additional stability and security, if the barn door 20 contacts the strike base 320.

The barn door may slide laterally in a first direction or a second direction with respect to the door frame 11, a barn door lock and handle set 1000 connected to at least a portion of an edge of the barn door 20, the handle assembly 1300 to allow the barn door 20 to open, and a lock assembly 1200 having the barn door lock bolt 1110 to lock the barn door 20 in response to the barn door lock bolt 1110 being extended, and the barn door strike 300 attached to the door frame 11, the barn door strike 300 including the plate 330 to contact the door frame 11, and the bolt receiving aperture 340 disposed on the plate 330, the bolt receiving aperture 340 to receive the barn door lock bolt 1110.

The barn door lock bolt 1110 may include the plurality of locking protrusions 1111 and 1112 disposed on side portions of the barn door lock bolt 1110 to extend into the bolt receiving aperture 340 in response to the barn door lock bolt 1110 being extended.

The bolt receiving aperture 340 may protrude from the door frame 11 in a direction perpendicular to the barn door 20 sliding laterally in the first direction or the second direction.

Installations Steps for a Pocket Door Privacy Set with Levers in the Down Position 1. After the door and frame have been prepped, take the mortise lock, remove the front cover plate, and temporarily set the plate and the two mounting screws aside.

2. Insert the mortise lock into the prep on the door’s edge. Using a screwdriver, screw in both of the #12×1" flat head combination screws into each pinhole located at the top and bottom.

3. Install the strike/dust cover assay into the frame using the two #12×1" flat head combination screws supplied for this purpose.

4. Install two ⅜" adaptor screws on each side into the mortise lock shown on template #19539 and install (2) ¼" adaptor screws on the interior side, again, as shown on template #19539.

5. Take one lever assembly and insert into the exterior door prep, you will have to make sure that the lever spindle is inserted into the spindle hub; while you are doing this, push the lever assembly against the door’s surface. The lever should be in the down position. Install the two mounting screws.

6. Take the other lever assembly into the door prep on the interior side, you will have to make sure that the lever spindle is inserted into the spindle hub while you are doing this, push the lever assembly against the door’s surface. The lever should be at the down position. Install the two mounting screws.

7. Install the thumb-turn assembly on the interior side, with the thumb-turn in the up position (12 a-clock) and the deadbolt retracted: insert the thumb-turn spindle into the hub, then install the mounting screws shown on template #19539.

8. Test the lever set by throwing the thumb-turn towards the strike. This should extend the latch forward and therein lock the door on the outside. Grab the exterior lever to make sure that it is rigid (locked).

9. Now test the interior lever. First, close the door all the way to the strike, then; turn the thumb-turn towards the strike. This will extend the latch bolt into the strike and lock the door to the outside. Next pull on the interior lever to open the door; you should be able to see the thumb-turn move back while you are operating the lever and consequently opening the door.

10. Hold the cylinder and check to see if the “wave washer” spring is behind the cylinder face. Taking the cylinder collar, insert the cylinder into the collar, making sure that the “wave washer” spring is between the collar and behind the cylinder head. Make sure that the plug cylinder is on the other side.

11. Thread the cylinder and the cylinder collar into the exterior side of the mortise lock-keep threading until the cylinder collar is no longer moving. Make sure that the keyway is at the 6 a-clock position.

2. Take a screwdriver and insert it into the hole that is just above the latch bolt. There is a set screw in this hole that needs to be tightened-do not over tighten, make sure to line-up the notches on the cylinder and on the cylinder plug.

13. Now test the cylinder-insert the key and verify that turning the key moves the latch bolt back and forth smoothly. Turning the key should also rotate the thumb-turn.

14. To conclude the installation, open the door (if it is not already open), and retract the latch bolt either by rotating the key or the thumb-turn. Locate the mortise lock face-plate and the two mounting screws that were set aside at the start of this installation and re-install the face plate using these two screws.

15. Conduct a final check to verify satisfactory performance using the key, the levers, and the thumb-turn.

16. On both sides of the door: navigate the roses (cover plates) about the levers-you will need to draw them upwards, then rotate them 90 degrees at the bend in lever-then snap them into place (no fasteners required).

17. Peel away the back of the "SLIDE" decal and adhere to the door as is shown in Template 19539 Installation Instructions.

18. The installation is complete.

Installations Steps for a Pocket Door Privacy Set with Lock Indicator with Levers in the Down Position 1. After the door and frame have been prepped, take the mortise lock, remove the front cover plate, and temporarily set the plate and the two mounting screws aside.

2. Insert the mortise lock into the prep on the door's edge. Using a screwdriver, screw in both of the #12×1" flat head combination screws into each pinhole located at the top and bottom.

3. Install the strike/dust box assembly into the frame using the two #12×1" flat head combination screws supplied for this purpose.

4. Install two ⅜" adaptor screws on each side into the mortice lock shown on template #19539 and install (2) ¼" adaptor screws on the interior side, again, as shown on template #19539.

5. Take one lever assembly and insert into the exterior door prep, you will have to make sure that the lever spindle is inserted into the spindle hub; while you are doing this, push the lever assembly against the door's surface. The lever should be at the down position. Install the two mounting screws.

6. Take the other lever assembly into the door prep on the interior side; you will have to make sure that the lever spindle is inserted into the spindle hub; while you are doing this, push the lever assembly against the door's surface. The lever should be in the down position. Install the two mounting screws.

7. Install the thumb-turn assembly on the interior side, with the thumb-turn in the up position (12 o-clock) and the deadbolt retracted: insert the thumb-turn spindle into the hub, then install the mounting screws shown on template #19539.

8. Test the lever set by throwing the thumb-turn towards the strike. This should extend the latch forward and therein lock the door on the outside. Grab the exterior lever to make sure that it is rigid (locked).

9. Now test the interior lever. First, close the door all the way to the strike, then; turn the thumb-turn towards the strike. This will extend the latch bolt into the strike and lock the door to the outside. Next pull on the interior lever to open the door; you should be able to see the thumb-turn move back while you are operating the lever and consequently opening the door.

10. Hold the cylinder and check to see if the "wave washer" spring is behind the cylinder face. Taking the cylinder collar, insert the cylinder into the collar, making sure that the "wave washer" spring is between the collar and behind the cylinder head. Make sure that the plug cylinder is on the other side.

11. Thread the cylinder and the cylinder collar into the exterior side of the mortise lock-keep threading until the cylinder collar is no longer moving. Make sure that the keyway is at the 6 o-clock position.

12. Take a screwdriver and insert it into the hole that is just above the latch bolt. There is a setscrew in this hole that needs to be tightened-do not over tighten, make sure to line-up the notches on the cylinder and on the plug.

13. Now test the cylinder-insert the key and verify that turning the key moves the latch bolt back and forth smoothly. Turning the key should also rotate the thumb-turn.

14. To conclude the installation, open the door (if it is not already open), and retract the latch bolt either by rotating the key or the thumb-turn. Locate the mortise lock faceplate and the two mounting screws that were set aside at the start of this installation and re-install the faceplate using these two screws.

15. Conduct a final check to verify satisfactory performance using the key, the levers, and the thumb-turn.

16. On both sides of the door: navigate the roses (cover plates) about the levers-you will need to draw them upwards, then rotate them 90 degrees at the bend in lever-then snap them into place (no fasteners required).

17. Install the lock indicator (5004) reference Template 17402, using the 3 mounting screws provided. Make sure, that the INDICATOR is in the OPEN position, while installing, (the green color should be displayed).

18. Peel away the back of the "SLIDE" decal and adhere to the door as is shown in Template 19539 Installation Instructions.

19. The installation is complete.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. As such, any combinations of the above embodiments are possible.

The invention claimed is:

1. A barn door strike assembly to receive a barn door lock bolt, the strike assembly comprising:
- a main body, comprising:
  - a bolt receiving aperture to receive the barn door lock bolt therein;
- a strike base, comprising:
  - a main body contacting portion connected to the main body to attach the main body to a wall, and
  - a door frame contacting portion perpendicularly disposed away from the main body contacting portion with respect to a direction to connect the door frame contacting portion to a door frame, such that the main body is configured to be mounted on the main body contacting portion on the strike base, such that the strike base defines an indentation on the main body contacting portion creating a channel with opposed apertures; and
- a connecting member and fastening means to connect the connecting member to the main body, such that the connecting member is configured to be received within the channel, such that the connecting member slides up in a first vertical direction and slides down in a second vertical direction to allow the main body to be adjusted in response to the barn door strike assembly being misaligned with the barn door lock bolt.

2. The barn door strike assembly of claim 1, further comprising:
- a plate receiving member disposed within the main body to receive at least one plate therein.

3. The barn door strike assembly of claim 1, further comprising:
- a bolt securing member disposed within the main body to resist movement of the barn door lock bolt while the barn door lock bolt is within the bolt receiving aperture.

4. A barn door strike assembly to receive a barn door lock bolt, the strike assembly comprising:
- a main body, comprising:

a bolt receiving aperture to receive the barn door lock bolt therein;

a strike base, comprising:

a main body contacting portion connected to the main body to attach the main body to a wall, and a door frame contacting portion perpendicularly disposed away from the main body contacting portion with respect to a direction to connect the door frame contacting portion to a door frame;

a guide ramp disposed on the main body contacting portion to guide a faceplate onto the barn door strike assembly, such that the main body is configured to be mounted on the main body contacting portion on the strike base, such that the strike base defines an indentation on the main body contacting portion creating a channel with opposed apertures; and a T-connecting member and fastening means to connect the T-connecting member to the main body, such that the T-connecting member is configured to be received within the channel, such that the T-connecting member slides up in a first vertical direction, slides down in a second vertical direction, slides left in a first horizontal direction, and slides right in a second horizontal direction to allow the main body to be adjusted in response to the barn door strike assembly being misaligned with the barn door lock bolt.

* * * * *